(No Model.)
W. N. WILLIS.
AIR BRAKE.
No. 303,777. Patented Aug. 19, 1884.
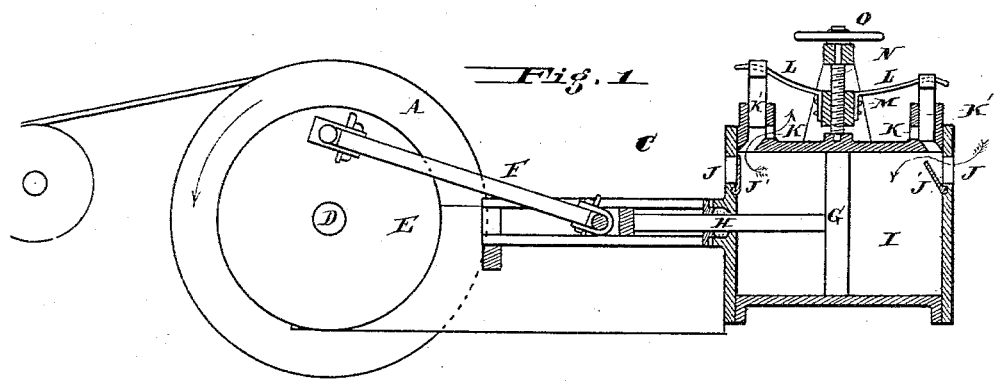
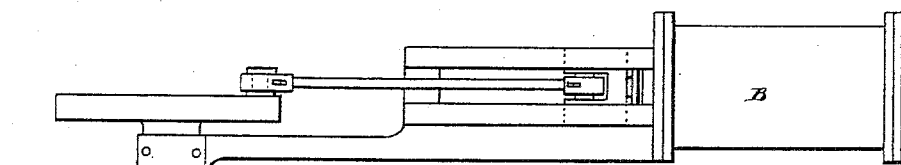
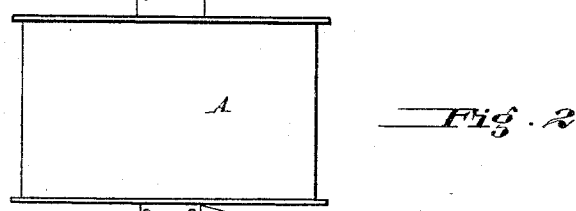
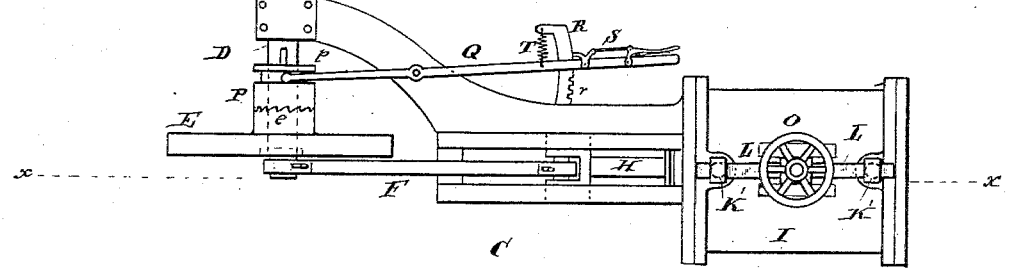
WITNESSES:
Joshua Matlack.
William McWade
INVENTOR
Walter N. Willis
By his atty.

UNITED STATES PATENT OFFICE.

WALTER N. WILLIS, OF TRAPPE, MARYLAND.

AIR-BRAKE.

SPECIFICATION forming part of Letters Patent No. 303,777, dated August 19, 1884.

Application filed November 2, 1883. (No model.)

*To all whom it may concern:*

Be it known that I, WALTER N. WILLIS, of Trappe, in the county of Talbot and State of Maryland, have invented an Improvement in Air-Brakes, of which the following is a specification.

My invention has reference to brakes; and it consists in certain improvements involving the compression of air as a retarding medium to the rotation of a shaft, all of which is fully set forth in the following specification, and shown in the accompanying drawings, which form part thereof.

Brakes now in general use consist of a shoe forced by different means against the rim of the wheel the revolution of which it is to retard. The force operating the brake is derived from some independent source. The retarding force exerted is proportional to the friction of the shoe against the rim of the wheel, and this in many instances is insufficient to stop or retard the rotating wheel within the required interval.

The object of my invention is to provide a suitable brake mechanism, whereby the wheel or shaft may be stopped in making a semi-revolution, or its speed of rotation may be regulated by the application of any desired resistance.

In the drawings, Figure 1 is a sectional elevation on line $x$ $x$ of Fig. 2, and shows my improved brake mechanism as applied to hoisting machinery; and Fig. 2 is a plan view of same.

A is the hoisting-drum. B is the hoisting-engine, which rotates the drum A by means of the shaft D. C is the air-brake mechanism, which is made as follows: A crank-wheel, E, may be secured to the shaft D, and, through the agency of pitman F, reciprocates the piston-rod H and piston G, which latter works in a cylinder, I, provided on each end with air-inlet valves J' J', which close ports J J, and outlet-ports K K, which are opened and closed by valves K' K', which valves are pressed down by springs L, whose tension may be regulated by a hand-wheel, O, and its shaft N, which screws up or down the nut M, to which said springs L are secured. Any other form of mechanism for pressing down the valves K' or for regulating the pressure on them may be used, if desired. Now, let it be conceived that a load on the end of the cable is tending to rotate the drum A, and it is desired to arrest its rotation. If the springs L are not under sufficient tension to prevent the valves K' from being opened, the air will be drawn in alternately from each end of the cylinder I through ports J and forced out under the spring-valves K', thereby retarding the revolution of the drum A, and if the springs L are put under sufficient tension, then the power exerted on the piston will be insufficient to force the valves K' open, and the air in the cylinder I will be compressed and the piston arrested before reaching the end of its stroke, thereby stopping the revolution of shaft D and drum A with an elastic but positive brake device.

Now, as under ordinary circumstances it might not be advisable to run the brake device all the time, I may make the crank-wheel E loose upon the shaft D, and provided on its back with ratchet-teeth $e$, which engage with corresponding teeth on a clutch-block, P, which works on a feather, $p$, on shaft D, and is reciprocated by a lever, Q, which is normally drawn over by a spring, T, so as to put on the brake, but which may be shifted in the opposite direction and held there by lock S and rack R, having notches $r$. Now, by this mechanism the brake mechanism may be set for instantly stopping the machine, and yet be thrown out of action by the clutch P, but when it is desired to put on the brake it is simply necessary to press upon the lock S and the brake is automatically applied.

I am aware of Patents No. 42,956, of 1864, and No. 85,113, of 1868, and claim nothing therein set forth or shown, as those devices have no means to regulate the amount of compression, and thereby adjustably control the speed of the rotating shaft.

Having now described my invention, what I claim as new, and desire to secure by Letters Patent, is—

1. A revolving shaft, in combination with a cylinder having inlet and outlet valves, a piston working in said cylinder, a crank on said shaft, connecting-rod, and regulating mechanism to act upon said outlet-valves to vary the resistance offered to the exhaust of the compressed air, substantially as and for the purpose specified.

2. The combination of a revolving shaft, air-compressing devices actuated by said revolving shaft, and spring mechanism to regulate the amount of compression of said air, whereby the speed of said shaft is controlled or its rotation stopped, substantially as and for the purpose specified.

3. The combination of a revolving shaft, means to rotate said shaft, air-compressing devices actuated by said revolving shaft, clutch mechanism to connect or disconnect said compressing device with said shaft, and mechanism to regulate the amount of compression of said air, whereby the speed of said shaft is controlled or its rotation stopped, substantially as and for the purpose specified.

4. The combination of shaft D, crank E, connecting-rod F, piston-rod H, piston G, cylinder I, valves J' J' and K' K', and mechanism to press said valves K' K' upon their seats, substantially as and for the purpose specified.

5. The combination of shaft D, crank E, connecting-rod F, piston-rod H, piston G, cylinder I, valves J' J' and K' K', and mechanism to press said valves K' K' upon their seats, and regulating devices to vary said pressure, substantially as and for the purpose specified.

6. The combination of shaft D, crank E, connecting-rod F, piston-rod H, piston G, cylinder I, valves J' J' and K' K', springs L, nut M, and screw N, substantially as and for the purpose specified.

In testimony of which invention I hereunto set my hand.

WALTER N. WILLIS.

Witnesses:
R. M. HUNTER,
WILLIAM McWADE.